United States Patent
Heidloff et al.

(10) Patent No.: US 8,175,581 B2
(45) Date of Patent: May 8, 2012

(54) SELECTIVE MESSAGE NOTIFICATION SYSTEM

(75) Inventors: Niklas Heidloff, Salzkotten (DE); Oliver Kieselbach, Hoevlhof (DE); Gregory R. Klouda, Lancaster, MA (US); Michael R. O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 10/989,037

(22) Filed: Nov. 15, 2004

(65) Prior Publication Data

US 2006/0104423 A1 May 18, 2006

(51) Int. Cl.
*H04M 1/725* (2006.01)

(52) U.S. Cl. .............. 455/412.2; 455/412.1; 455/413; 455/414.1; 455/415; 379/67.1; 379/69; 379/70; 379/82; 379/88.16

(58) Field of Classification Search ............. 379/67.1, 379/99.12, 69, 70, 82, 88.16–88.19, 88.2, 379/88.21–88.27; 709/206; 455/412.1–412.2, 455/413, 414.1, 415–417
See application file for complete search history.

(56) References Cited

U.S. PATENT DOCUMENTS

| | | | | |
|---|---|---|---|---|
| 5,706,211 A * | 1/1998 | Beletic et al. | ................. | 709/206 |
| 6,438,213 B2 * | 8/2002 | Takeda et al. | ................. | 379/67.1 |
| 6,628,194 B1 * | 9/2003 | Hellebust et al. | ............. | 340/7.5 |
| 6,745,230 B1 * | 6/2004 | Cao et al. | ....................... | 709/206 |
| 6,782,079 B2 * | 8/2004 | Skladman et al. | ......... | 379/88.13 |
| 6,807,566 B1 * | 10/2004 | Bates et al. | ................... | 709/206 |
| 2003/0212680 A1 * | 11/2003 | Bates et al. | ...................... | 707/7 |
| 2004/0181587 A1 * | 9/2004 | Cao et al. | ..................... | 709/206 |

* cited by examiner

*Primary Examiner* — Wayne Cai
(74) *Attorney, Agent, or Firm* — Steven M. Greenberg, Esq.; Carey, Rodriguez, Greenberg & O'Keefe

(57) ABSTRACT

A method, system and apparatus for the selective notification of incoming electronic messages. In this regard, a selective message notification method can include selectively generating a notification for a received message based upon pre-determined criteria irrespective of how the received message is handled. The pre-determined criteria can include a manually specified criteria, a rules based criteria, or a profile based criteria.

4 Claims, 3 Drawing Sheets

SELECTIVE MESSAGE NOTIFICATION SYSTEM

BACKGROUND OF THE INVENTION

1. Statement of the Technical Field

The present invention relates to electronic messaging systems and more particularly to notification systems for incoming messages in an electronic messaging system.

2. Description of the Related Art

Electronic messaging represents the single most useful task accomplished over wide-scale computer communications networks. Some argue that in the absence of electronic messaging, the Internet would have amounted to little more than a science experiment. Today, electronic messaging seems to have replaced the ubiquitous telephone and fax machine for the most routine of interpersonal communications. As such, a variety of electronic messaging systems have arisen which range from real-time instant messaging systems and wireless text pagers to asynchronous electronic mail systems.

Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties. Today, more e-mails are processed in a single hour than phone calls. Clearly, e-mail as a mode of communications has been postured to replace all other modes of communications save for voice telephony.

In the early days of computing, few participated in electronic messaging such that one could ascertain the presence of a new message simply by inspecting a directory of incoming messages. As the popularity of electronic messaging has grown over the years, however, notification systems have arisen to provide both audible and visual notifications when a new electronic message has been received. Importantly, the explosive use of electronic messaging systems has resulted in entirely separate applications having the sole purpose of managing the notification duties of an electronic messaging system.

For many computing users of electronic messaging systems, the volume of electronic messages received daily can be unmanageable and often can result in the recipient of a volume of electronic messages becoming overwhelmed. While in the past electronic messaging notification systems alerted end users to the receipt of a message, the frequent receipt of messages and resulting repetitive notifications can become irritating to the end user. In fact, oftentimes end user simply disable the notification system because there is nary a chance to review all incoming e-mails at once to determine which are important and which can be ignored for the time being. To do so, however, can cause important messages to go unnoticed.

Most electronic messaging users address the problem of excessive messaging by automating the processing of incoming messages. For instance, it is well known to apply rules to incoming messages in order to determine whether to automatically delete received messages, to file received messages in a particular location, to quarantine messages as "junk mail", or to store received messages in an inbox. Still, the notification system remains unchanged in that all messages when received, regardless of the processing of the message, can result in a notification unless it is pre-determined to delete specified ones of the received messages. Accordingly, to suppress the notification for a received message, the message first must be deleted without affording the recipient an opportunity to review the message at a later time.

SUMMARY OF THE INVENTION

The present invention addresses the deficiencies of the art in respect to electronic message notification systems and provides a novel and non-obvious method, system and apparatus for the selective notification of incoming electronic messages. In this regard, a selective message notification method can include selectively generating a notification for a received message based upon pre-determined criteria irrespective of how the received message is handled. The pre-determined criteria can include a manually specified criteria, a rules based criteria, or a profile based criteria.

Specifically, the generating step can include both retrieving a manual setting indicating whether or not to provide a notification for a received message while generating the notification only if permitted by the manual setting. The generating step also can include retrieving at least one rule for determining whether to generate a notification for a received message, evaluating the rule based upon one of message context or message content for the received message, and generating the notification only if permitted by the evaluated rule. The generating step yet further can include retrieving a profile for a recipient of the received message, comparing attributes of the profile with attributes of the received message, and generating the notification only if permitted by the comparison of the attributes of the profile and the attributes of the received message.

The retrieving step can include the step of retrieving a manual setting indicating that a notification is to be provided for all received messages. By comparison, the evaluating step can include the step of determining whether the received message has been marked important. Moreover, the evaluating step can include the step of determining whether less than a threshold number of recipients have been designated to receive the received message. The evaluating step yet further can include the step of determining whether the received message is a reply to a previously transmitted message. Finally, the comparing step can include the steps of identifying a preferred set of message senders, and determining whether the received message had been transmitted by a sender in the preferred set. Similarly, the comparing step can include identifying a preferred set of words, and determining whether the received message contains a threshold number of the preferred set of words.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for the selective notification of received messages. In accordance with the present invention, message received notifications can be selectively provided only where an incoming message satisfies specific criteria. In a preferred aspect of the invention, the criteria can include rules based upon either the identity of the message sender, the content of the message, the context in which the message has been received, or the number of recipients designated to receive the message. Otherwise, though the message can be received into a message repository, no notification need be provided. In this way, end users can be notified of a message only where a message has been deemed important enough to merit the issuance of a notification.

Figure 1:
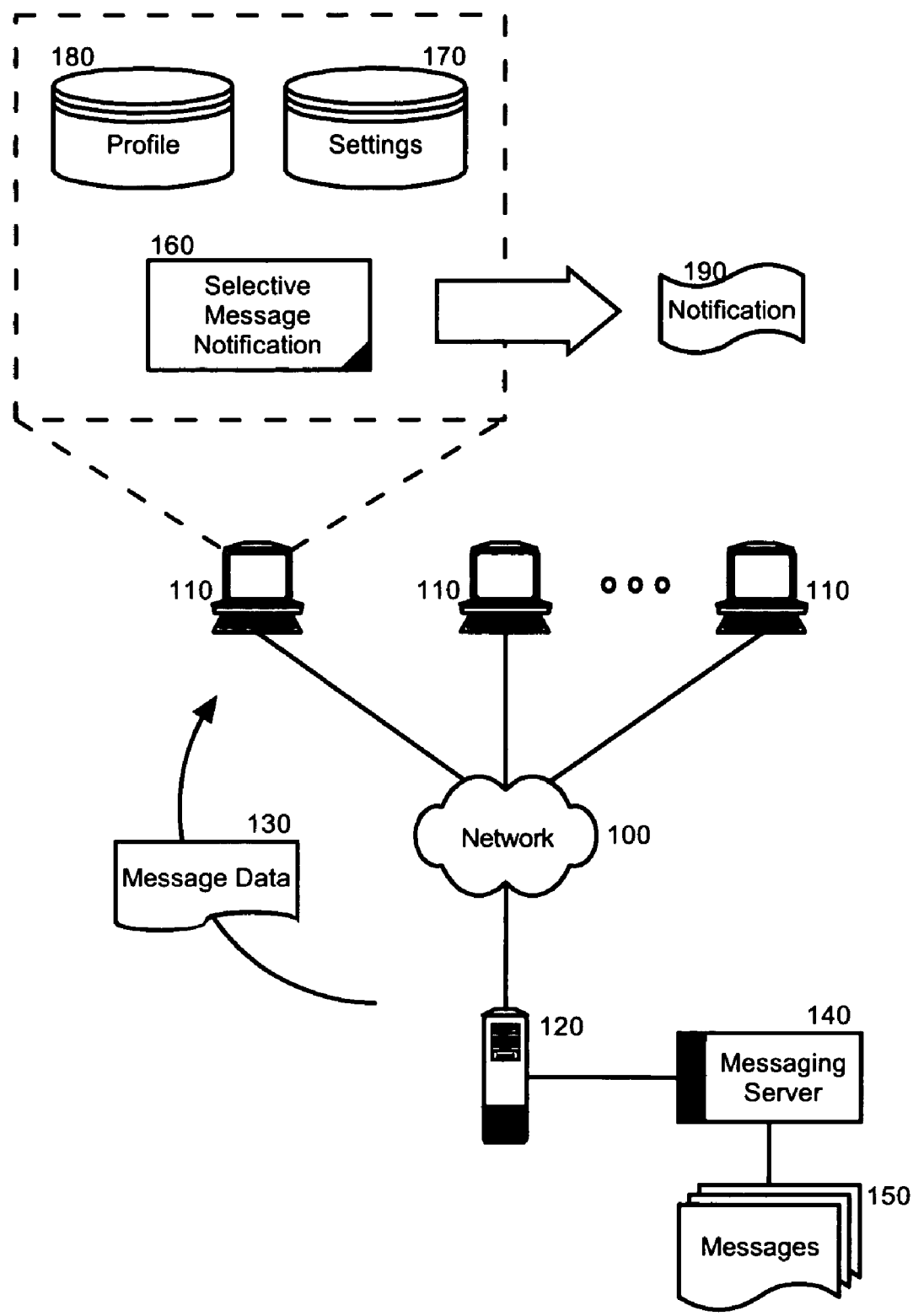
FIG. 1 is a schematic illustration of an electronic messaging architecture configured for use with a selective notification system in accordance with the inventive arrangements.

FIG. 1 is a schematic illustration of an electronic messaging architecture configured for use with a selective notification system in accordance with the inventive arrangements. Referring to FIG. 1, one or more messaging clients can be communicatively coupled to a server computing device 120 hosting a messaging server 140 over a data communications network 100. The messaging clients 110 can support the management of messaging processing services provided by the messaging server 120 which can include the transmission, receipt and storage of messages 150. In this regard, the messaging clients 110 can include e-mail clients, instant messaging clients, text messaging clients, chat clients and the like. Moreover, the messaging clients 110 can be disposed in a traditional computing device, a handheld computing device, or any other pervasive device including cellular telephones.

In accordance with the present invention, each of the messaging clients 110 can include a selective message notification system 160 coupled to a settings data store 170 and a profile data store 180. The selective message notification system 160 can process message data 130 received from the messaging server 140 to determine whether or not to issue a notification. The decision making process of the selective message notification system 160 can range from a mere reference to manual settings in the settings data store 170, to the evaluation of rules based upon the content or context of the message data 130, to the application of profile data in the profile data store 180.

Figure 2:
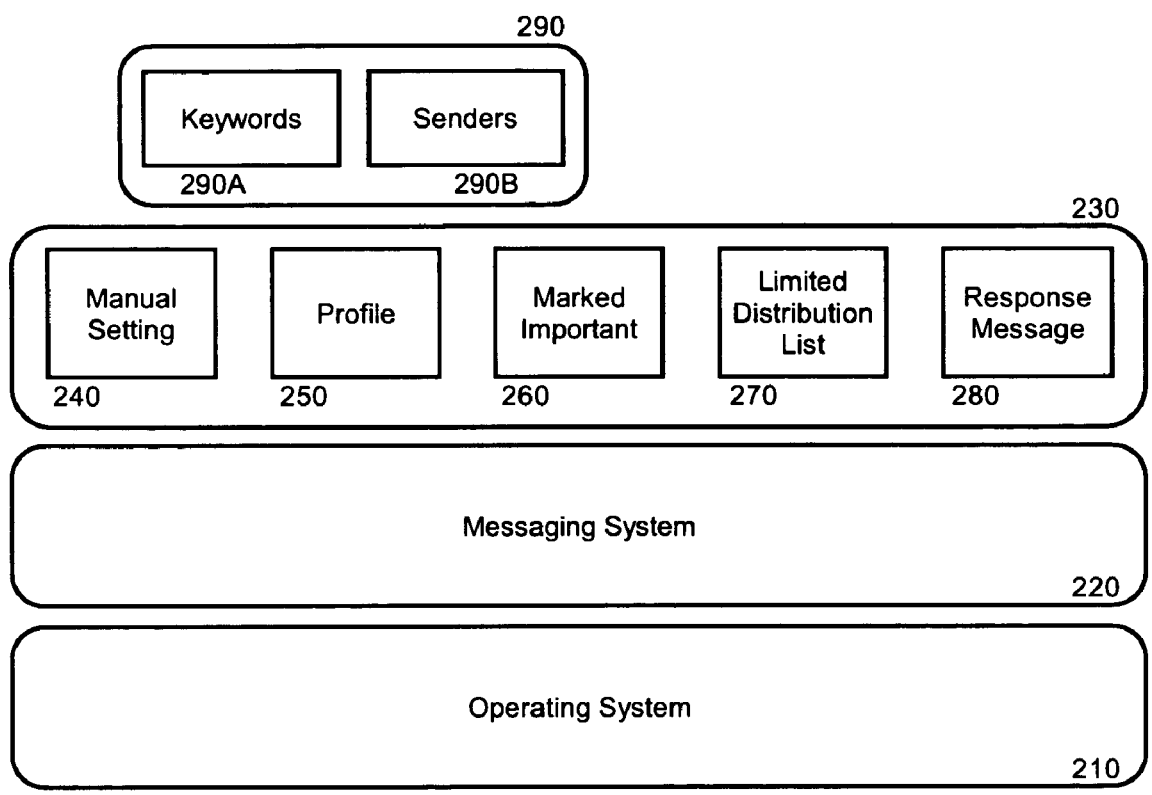
FIG. 2 is a block diagram of a messaging device architecture configured for use with a selective notification system in accordance with the present invention; and, FIG. 3 is a flow chart illustrating a process for selective issuing message notifications.

In more particular illustration, FIG. 2 is a block diagram of a messaging device architecture configured for use with a selective notification system in accordance with the present invention. The architecture can include a messaging system 220 hosted by an operating system 210 in a computing device (not shown) such as a personal computer, workstation, personal digital assistant, cellular telephone or other such pervasive device. The messaging system 220 can be configured to support synchronous communications such as instant messages, or the messaging system 220 can be configured to support asynchronous communications such as e-mail. In either case, the messaging system 220 can include logic for generating a visual, audible or otherwise noticeable notification when receiving selected electronic messages.

Importantly, a selective notification system 230 can be coupled to the messaging system 220. The selective notification system 230 can include logic for determining whether to issue a received message notification based upon one or more pre-determined criteria. The pre-determined criteria can include manual setting data 240, profile data 250, marked important data 260, limited distribution list data 270, or response message data 280.

The manual setting data 240 can include a hard determination of whether or not to issue a notification. The marked important data 260 can include a rule that specifies that a notification is to be issued only if the received message has been marked important. The limited distribution list data 270 can include a rule specifying that a notification is to be issued only if the distribution for the message has been limited, such as where less than a certain number of recipients have been specified in the message, or whether no recipients have been carbon copied, or where no other recipients have been specified. The response message data 280 can include a rule specifying that a notification is to be issued if the received message is a response to a message transmitted by the recipient.

Notably, the profile data 250 can include processing logic 290 relating to one or both of message keywords 290A and message senders 290B. In the instance of message keywords 290A, a set of words determined to be relevant to the recipient can be stored as message keywords 290A. The words can be determined to be relevant based upon the receipt of past messages, or based upon the manual specification, for example. Where a received message includes a threshold number of words listed in the keywords 290A, a notification can be issued. The senders 290B, by comparison, can include a list of message senders for whom notifications are to be issued when messages are received from the specified message senders. In this way, the issuance of a message notification can be highly personalized for each messaging client in a messaging system.

Figure 3:
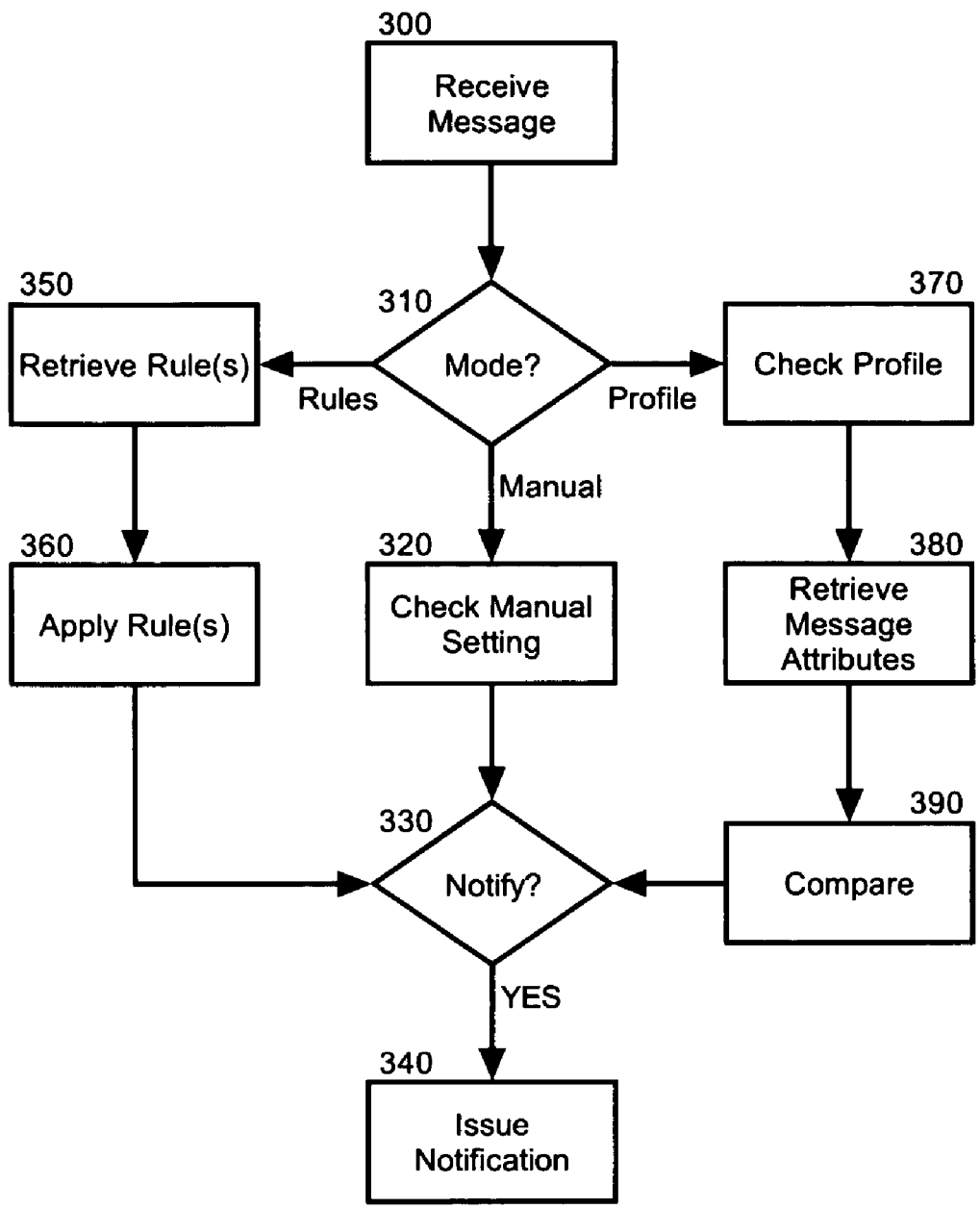

To illustrate the operational logic of the selective message notification system, FIG. 3 is a flow chart illustrating a process for the selective issuing of message notifications. Beginning in block 300, a message can be received for processing in a messaging system. In block 310, it can be determined which mode of selection to apply to the received message. Preferably, the modes can include rule processing, manual processing and profile processing. In the case of manual processing in block 320, a manual setting can be checked to determine whether to issue a notification. For instance, a manual selection to receive notifications for all messages can be applied where an end user is expecting a message. In decision block 330, if a notification is to be issued, in block 340 a notification can be issued, such as a visual indicator or an audible indicator.

The rule mode can be substantially more complex than the manual mode. In the rule mode, one or more rules can be retrieved in block 350 and applied in block 360 to the content and/or context of the received message. Exemplary rules can include whether fewer than a certain number of recipients have been designated to receive the message, whether the received message is a reply to an earlier transmitted message by the recipient, or whether the received message has been marked important or urgent. The skilled artisan will note that these are but a few possible rules and others can suffice for purposes of determining whether or not to issue a notification for a received message.

Finally, the profile mode can be a highly personalized mode for determining when to issue a notification for a received message. In block 370, a profile for the recipient of the message can be retrieved to identify one or more prespecified senders or keywords. In block 380, one or more message attributes can be retrieved, such as the identity of the sender, one or more recipients, or the textual content of the message. In block 390 the message attributes can be compared to the profile to determine in decision block 330 whether or not to issue a notification in block 340.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A selective message notification method comprising the step of interrupting a message recipient within a client with a message notification for a received message only when the received message satisfies a pre-determined criteria, wherein said interrupting step further comprises the steps of:
   determining a mode of selection to be applied to a received message;
   checking a manual setting to determine whether or not to issue a notification for the received message if in a manual processing mode, retrieving and applying a rule to determine whether or not to issue a notification for the received message if in a rule mode, and retrieving a profile for a recipient of said received message, comparing attributes of said profile with attributes of said received message, and determining whether the comparison of the attributes of the profile with the attributes of the received message permit a notification for the received message if in a profile processing mode; and,
   responsive to a determination that determination irrespective of the mode does permit a notification generating said notification.

2. A selective message notification method comprising the step of interrupting a message recipient within a client with a message notification for a received message only when the received message satisfies a pre-determined criteria, wherein said interrupting step further comprises the steps of:
   determining a mode of selection to be applied to a received message;
   checking a manual setting to determine whether or not to issue a notification for the received message if in a manual processing mode, retrieving and applying a rule to determine whether or not to issue a notification for the received message if in a rule mode, and retrieving a profile for a recipient of said received message, comparing attributes of said profile with attributes of said received message, and determining whether the comparison of the attributes of the profile with the attributes of the received message permit a notification for the received message if in a profile processing mode; and,
   responsive to a determination that the comparison does not permit a notification generating said notification only if a manual setting retrieved in the profile indicates that a notification is to be provided for all received messages.

3. A machine readable storage having stored thereon a computer program for selective message notification, the computer program comprising a routine set of instructions stored on the medium which when executed by a machine cause the machine to perform the step of interrupting a message recipient within a client with a message notification for a received message only when the received message satisfies a pre-determined criteria, wherein said interrupting step comprises the steps of:
   determining a mode of selection to be applied to a received message;
   checking a manual setting to determine whether or not to issue a notification for the received message if in a manual processing mode, retrieving and applying a rule to determine whether or not to issue a notification for the received message if in a rule mode, and retrieving a profile for a recipient of said received message, comparing attributes of said profile with attributes of said received message, and determining whether the comparison of the attributes of the profile with the attributes of the received message permit a notification for the received message if in a profile processing mode; and,
   responsive to a determination that determination irrespective of the mode does permit a notification generating said notification.

4. A machine readable storage medium having stored thereon a computer program for selective message notification, the computer program comprising a routine set of instructions which when executed by a machine cause the machine to perform the step of interrupting a message recipient within a client with a message notification for a received message only when the received message satisfies a pre-determined criteria, wherein said interrupting step comprises the steps of:
   determining a mode of selection to be applied to a received message;
   checking a manual setting to determine whether or not to issue a notification for the received message if in a manual processing mode, retrieving and applying a rule to determine whether or not to issue a notification for the received message if in a rule mode, and retrieving a profile for a recipient of said received message, comparing attributes of said profile with attributes of said received message, and determining whether the comparison of the attributes of the profile with the attributes of the received message permit a notification for the received message if in a profile processing mode; and,
   responsive to a determination that determination irrespective of the mode does permit a notification generating said notification.

* * * * *